United States Patent [19]

Bottorf et al.

[11] Patent Number: 4,825,381

[45] Date of Patent: Apr. 25, 1989

[54] MOVING MAP DISPLAY

[75] Inventors: Scott A. Bottorf; Jeffrey D. Russell; Conway A. Southard, all of Cedar Rapids, Iowa

[73] Assignee: Rockwell International Corporation, El Segundo, Calif.

[21] Appl. No.: 33,298

[22] Filed: Mar. 31, 1987

[51] Int. Cl.$^4$ .............................................. G06F 15/72
[52] U.S. Cl. ...................................... 364/443; 364/518; 340/724; 340/745; 340/799; 340/990
[58] Field of Search ............... 364/521, 518, 449, 443; 340/727, 731, 745, 798, 799, 990, 995, 988, 724

[56] References Cited

U.S. PATENT DOCUMENTS

| | | | |
|---|---|---|---|
| 3,179,883 | 4/1965 | Farrow | 324/73 R |
| 3,497,760 | 6/1968 | Kiesling | 340/731 |
| 3,659,283 | 4/1972 | Ophir | 340/731 |
| 4,138,726 | 2/1979 | Girault et al. | 364/521 |
| 4,153,896 | 5/1979 | White | 340/731 |
| 4,167,019 | 9/1979 | Shepperd | 358/22 |
| 4,195,293 | 3/1980 | Margolin | 340/732 |
| 4,283,724 | 8/1981 | Edwards | 340/731 |
| 4,284,989 | 8/1981 | Parsons | 340/731 |
| 4,360,876 | 11/1982 | Girault et al. | 364/449 |
| 4,387,370 | 6/1983 | Katagi | 340/727 |
| 4,420,770 | 12/1983 | Rahman | 358/183 |
| 4,462,024 | 7/1984 | Strolle | 340/727 |
| 4,471,349 | 9/1984 | Strolle | 340/727 |
| 4,527,155 | 7/1985 | Yamaki et al. | 340/990 |
| 4,543,572 | 6/1983 | Tanaka et al. | 340/723 |
| 4,584,573 | 4/1986 | Ito | 340/734 |
| 4,591,842 | 5/1986 | Clarke et al. | 340/723 |
| 4,591,850 | 5/1986 | Lundström | 340/799 |
| 4,608,656 | 8/1986 | Tanaka et al. | 364/449 |
| 4,648,045 | 3/1987 | Demetrescu | 340/799 |
| 4,660,029 | 4/1987 | Houda et al. | 340/744 |
| 4,737,916 | 4/1988 | Ogawa et al. | 364/443 |

OTHER PUBLICATIONS

Computer Graphics, vol. 18, No. 3, Jul. 1984, "Simulation of Natural Scenes Using Textured Quadratic Surfaces" by Geoffrey Y. Gardner, pp. 11-20.

Primary Examiner—Parshotam S. Lall
Assistant Examiner—Thomas G. Black
Attorney, Agent, or Firm—Gregory G. Williams; M. Lee Murrah; H. Fredrick Hamann

[57] ABSTRACT

A multichannel moving map display having a first channel for processing of background geographical data and inputting said process data into a display memory for scanning by a display and a second channel for generating cultural features and storing the same in a second display memory for scanning by the display. A dual bank display memory concept is disclosed for both the first and second display memories.

6 Claims, 1 Drawing Sheet

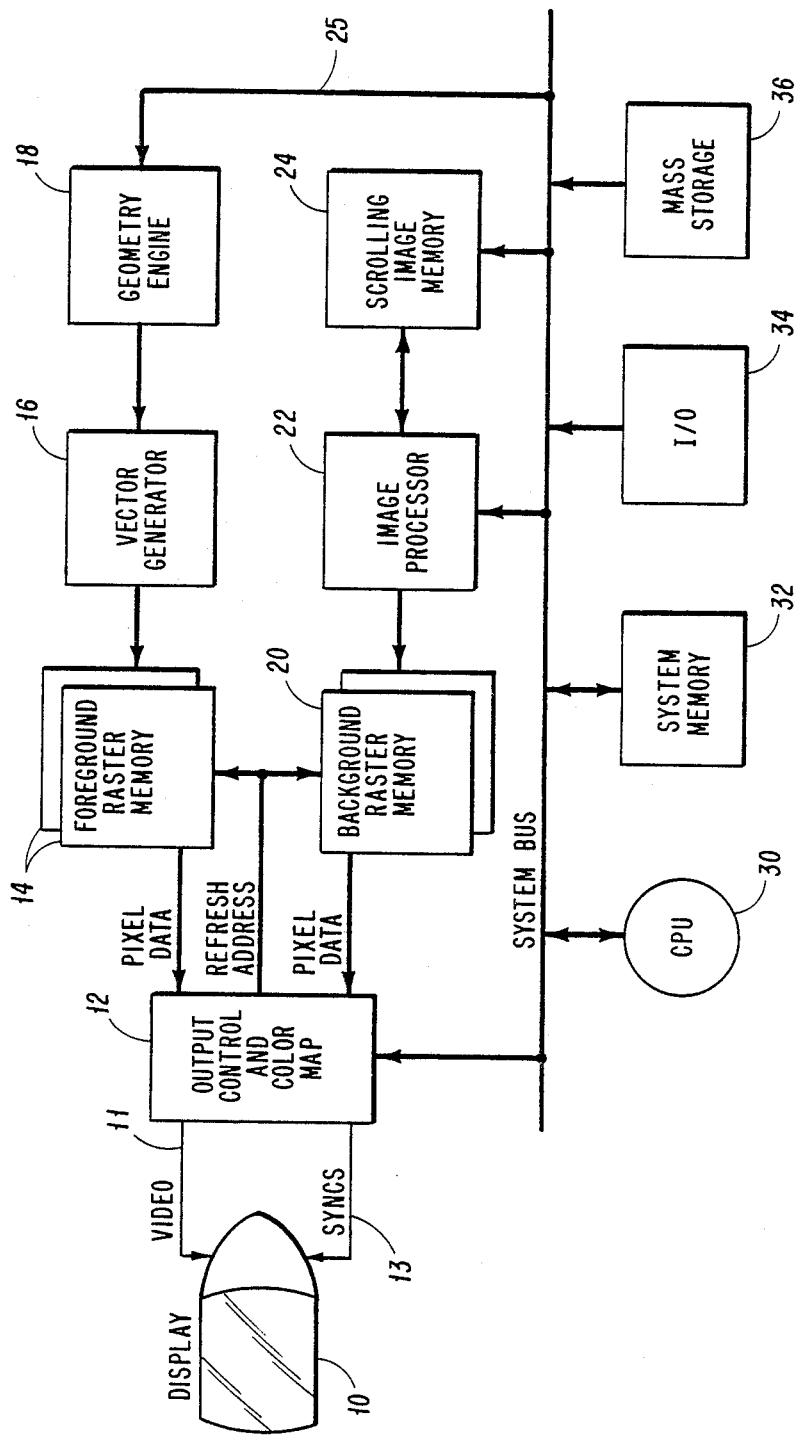

MOVING MAP DISPLAY

BACKGROUND OF THE DISCLOSURE

Cross-References to Related Applications

This application relates to the subject matter of a co-pending application by Scott A. Bottorf, entitled "Surface Texture Generator for Graphic Displays", filed on even date herewith and assigned to the same assignee, the serial number of which is Ser. No. 033,300, and to a second co-pending application by Scott A. Bottorf, entitled "Scrolling Image Memory for High-speed Avionics Moving Map Display", filed on even date herewith and assigned to the same assignee, the serial number of which is Ser. No. 033,297; the subject matter of both of these applications is incorporated herein by this reference.

Field of the Invention

The present invention is generally related to avionics moving map displays, and more particularly concerns an apparatus and method for displaying a moving topographical map, together with additional non-terrain features thereon.

In recent years, it has become desirable to provide the pilot of an aircraft with a moving map display of the terrain over which he is flying. Depending upon the purpose of the flight, the aircraft, its flight plan, etc., the pilot may desire different information. For example, the pilot of a small private aircraft might desire to have displayed in addition to the terrain all airports, while the crew of a jumbo jet would likely only wish to see the airports having runways capable of receiving larger aircraft. Military aircraft display requirements would be a function of the mission complexity, sophistication of the weapons systems, etc. The difficulty in implementing a moving map display with additional non-terrain features thereon increases as the vehicle's ground speed increases.

One type of moving map display that has been disclosed in the past is described in U.S. Pat. No. 4,484,192 to William Seitz et al, which is hereby incorporated by this reference. This design utilizes a scan memory that is updated one row or column at a time during a video blanking signal. During this signal, which actually is a gap or interruption of the signal from the scan memory to the display device, new updating image data may be input into the scan memory.

While this system is capable of meeting needs of certain pilots traveling at a relatively slow groundspeed, it does have serious drawbacks when the aircraft is traveling at relatively high speeds or the pilot needs the display of rapidly changing non-terrain features.

Scan memory update, utilizing the column-by-column o4 row-by-row update during a blanking signal, makes it difficult to display the rapidly changing terrain below a relatively fast aircraft, or to rapidly change the display of certain non-terrain features.

Consequently, a need exists for improvement in moving map displays which will result in the ability to update the display to correspond to the terrain below a relatively fast aircraft, or to rapidly change the non-terrain display features.

SUMMARY OF THE INVENTION

It is an object of the present invention to greatly increase the overall display update rate.

It is a feature of the present invention to provide a multichannel display.

It is an advantage of the present invention to divide the display information into separate channels and to increase the update rate by allowing independent manipulation of the channels.

It is a further object of the present invention to increase the display memory update rae.

It is a further feature of the present invention to include parallel display memories for each channel.

It is a further advantage of the present invention to allow continuous access or data input into a display memory.

The present invention provides a multichannel moving map display designed to fulfill the aforementioned needs, satisfy the earlier-propounded objects, contain the above-described features, and produce the previously-stated advantages. The invention is carried out by a "non-linear" display architecture, in the sense that a single channel display architecture for processing the information to be displayed is not utilized. Instead, the information to be displayed is divided into separate channels. The separate channels provide for independent update and manipulation of the information to be displayed. The rate of the overall update of the displayed information is increased by the ability to independently manipulate and update the separate channels. Moreover, the more time sensitive information may be displayed in a separate and independent channel, thereby greatly increasing the update rate of the most critical information, and providing a method of rapidly selecting or deselecting the information to display.

Accordingly, the present invention relates to an apparatus and method for displaying a moving map display with additional display features thereon by utilizing a multichannel display.

BRIEF DESCRIPTION OF THE DRAWINGS

The invention may be more fully understood by reading the following description of preferred embodiments of the invention in conjunction with the appended drawing wherein:

The FIGURE is a schematic diagram of the display system of this invention utilizing a dual channel system and parallel display memories for each channel.

DETAILED DESCRIPTION

Referring to the drawing, there is shown a multichannel moving map display, which includes a video display 10, that may take any form including but not limited to, CRTs, LCDs, TFEL displays, LEDs, and plasma displays, all of which are capable of displaying a moving map image which is provided by the remainder of the moving map display approach.

The raw image data information which eventually determines the image to be displayed in display 10 is contained in the mass storage 36, which may take any form including but not limited to magnetic disks, magnetic tape, optical disks, ROM, RAM, etc. The data of the mass storage 36 contains all of the topographical information, preferably comprising the elevation of each separate terrain sector to be displayed. The output of mass storage 36 connects with the system bus 38 interconnecting the input/output 34, the system memory 32, and the CPU 30. The input/output 34 may be in several forms, including but not limited to in-cockpit pilot controls, direction and position detecting devices, etc. It is contemplated that one of the input/output devices 34 could be an on-board global positioning system, which would determine the precise location to display the aircraft on the moving map display. The system memory 32, together with the CPU 30, via their interconnection through the system bus 38, controls the information transferred between input/output 34 and the mass storage 36, with the scrolling image memory 24 and the geometry engine 18, through line 25. Numerous possible implementations of the mass storage 36, input/output 34, system memory 32 and CPU 30 could be utilized, but an IBM PC/AT is capable of providing the functions of all four. It is contemplated that, in an actual aircraft, the hardware necessary to carry out the functions of mass storage 36, input/output 34, system memory 32 and CPU 30 would be customized to meet the peculiar needs of a certain aircraft.

It is suggested that the overall update rate of the display 10 could be increased by separating the data of the mass storage 36 and the input/output 34 into a plurality of data information processing channels. In the FIGURE, a dual channel display architecture is shown where the data to be displayed by each channel is separated into a foreground channel and a background channel. If the foreground channel is to provide cultural information, such as location of roads, radio towers, airports, defense installations, other aircraft, etc., and the background channel is to provide the moving map display of the terrain showing a two- or three-dimensional representation of the topography of the land immediately about the aircraft, then it would be possible for the foreground channel to be updated and thereby permitting a new display to be achieved with a much higher frequency, because the background, or terrain, map channel, typically would involve the processing and display of a much larger volume of information. It is quite desirable to have the ability to rapidly update the cultural features in the foreground channel, which would typically include the locations of other aircraft. This would be particularly valuable for commercial airliners traveling through crowded airspace near large metropolitan airports, or even more importantly, for military aircraft which would be monitoring the location of enemy aircraft. By providing a multichannel approach, certain cultural features may be updated at a higher frequency, thereby permitting a more timely display of the most crucial information.

The scrolling image memory 24 in the background channel links the data received through the system bus 38 from the input/output 34 and the system storage 36 to the image processor 22. The scrolling image memory 24 in essence is a memory bank of the terrain altitude data which is arranged in a geometric configuration. This scrolling image memory 24 is discussed further in the co-pending patent application entitled "Scrolling Image Memory for High Speed Avionics Moving Map Display", by Scott A. Bottorf, mentioned previously.

The image processing system may comprise an image memory such as a $(512 \times 512 \times 8)$ or the scrolling image memory 24 and a single board image processor 22. The image memory 24 holds a digitized image which is scanned by the processor to produce a scaled, rotated, and translated image in a raster or display memory 20. The contents of the image memory 24 are initially loaded via the system bus and remain unchanged during operation.

The image processor 22 is a microprogrammed device which effectively performs the following transformation for each point in the display memory 20 space:

$$x' = x^* \cos(a)/sc + y^* \sin(a)/sc + xt$$

$$y' = x^* \sin(a)/sc - y^* \sin(a)/sc + yt$$

where
 (x', y') are image memory coordinates
 (x, y) are rater memory coordinates
 xt & yt are translation values (image coordinate system)
 a is the desired rotation angle
 sc is the desired scale factor The transformation algorithms are implemented using digital differential analyzer (DDA) techniques to eliminate the need for costly parts such as high speed multipliers. With the DDA's the transformation is computed iteratively as:

$$x = x + \text{delta } x$$

$$y = y + \text{delta } y$$

requiring only two addition operations per point. In operation the image processor 22 scans through the image memory 24 (at an angle and rate determined by the transformation parameters) first accessing the image pixels needed for the first line in the output display memory 20. Then, again using digital differential analyzers (DDA's), the starting point for the next output line is computed, and that line is then transformed. After scanning all lines of the output memory 20 the processor waits for access of parameters to begin again. Sufficient precision in the DDA circuits (24bits) may be provided to allow clipping on any accesses that are outside of the boundaries of the image memory 24. This prevents a wraparound effect from occurring.

The image processor 22 treats the display screen 10 as a viewport through which the image is observed. The size, position, and angle of the viewport are determined by the user. Once the viewpoint has been transformed, the starting x and y coordinates (image coordinate system) and the delta x and delta y values for both the scan and edge lines are fed by the CPU 30 to the image processor 22. The image processor 22, upon receipt of all six (6) parameters, transforms the image and causes the display 10 to display the destination bank of display memory (the display is linked to a dual bank foreground raster or display memory 14; writing occurs in the non-displayed bank). The interface to the CPU 30 and bus 38 consist of a first-in first-out (FIFO) buffer of sixty-four (64) words in depth. The interface uses a single address on the system bus 38; when read, the FIFO input ready and transformation done status bits are returned. Whenever the FIFO input ready status is true, a new sixteen (16) bit parameter may be written to the FIFO. The done bit need not be used; however, it does provide a means of synchronization with some real time process.

Each bit is typically transformed in 160 nS, thus the equivalent throughput for the image processor 22 is 62.5 M operations per second. For example, for a display memory size of 640×485 pixels 50 mS is typically required for a complete transformation. A frame rate of 20 Hz can typically be achieved, provided the input FIFO's are not allowed to empty. The device could also be synchronized (at 15 Hz) with an external video source.

The foreground channel comprises essentially a geometry engine 18 which serves as the input to the vector generator 16 which serves as an input to the foreground display memory 14. The geometry engine is a high speed mathematical processor optimized for geometrical transformations involving sines, cosines, multiplication and addition. As commanded by the CPU 30, it performs rotation, scaling and translation of objects which are stored within the geometry engine for purposes of fast access. The transformation parameters are supplied by the CPU 30. The output of the geometry engine is a sequence of transformed line end points (x-y coordinates). These are supplied to the vector generator 16, whose function is to derive the intermediate points comprising the line by interpolating between the start and the end. The derived x-y points are then output to the foreground display memory 14 and then on to the display 10.

The geometry engine 18 can be based upon the TMS 32010 VLSI device developed by Texas Instruments for digital signal processing, but any appropriate device may be substituted. It may contain a $16 \times 16$ combinatorial multiplier over 100 registers, 32-bit ALU, and barrel shifters. Through-put approaches 5 MIPS for math-intensive applications such as geometric transformations. Associated with the TMS 32010 can be a $512 \times 16$ program memory PROM, $512 \times 16$ FIFOs, at both the input and output interfaces, and a $32K \times 16$ EPROM containing look-up tables (e.g., sine/cosine, object definitions). This hardware may be capable of nearly 200,000 point transformations per second, which is typically adequate for most display applications. In addition to transforming pre-defined objects, the geometry engine program provides computed arc and vector capability. Arcs are specified by a starting x-y location, initial angle, length, and radius. The engine is capable of drawing arcs of arbitrary radius from 2 pixels to infinity. At infinite radius, a straight vector results. Arc generation may occur at a rate of 160,000 segments per second. Another possible inclusion in the geometry engine is a dashing capability. An arbitrary number of simple or complex repetitive dashing parameters may be supported. Unlike current methods, the dashing parameter in use is defined dynamically by a parameter sent from the system CPU 30. This is particularly advantageous for certain symbologies such as trend vectors; and lower life-cycle accrues since PROMs are no longer required. The TMS 32010 based geometry engine 18 supplies x-y endpoints and color via a FIFO to an autonomous vector generator 16.

A typical scene might include hundreds of objects, thousands of vectors, and tens of thousands of pixels. The CPU 30 typically must send over less than 50K parameters per second. The geometry engine 18 as contemplated may process about 300K coordinates per second, and the vector generator 16 as contemplated may be capable of generating up to 8 million pixels per second. The function of the vector generator 16, then, is to take the end points of the vector and generate all the intermediate points of the line to be drawn.

This is a common problem in graphics applications, and is typically accomplished with a DDA. First, the axis of greatest change is determined; this decides which coordinate is the independent variable. Then the value of the dependent coordinate is interpolated. The independent variable is defined as the run, while the dependent variable is defined to be rise. The interpolation of the rise coordinate is performed by adding the slope of the vector to the previous value of the rise coordinate at each step of the run. This new value is rounded to the nearest integer to give the correct coordinates of the nearest pixel to the point on the line. With these parameters, the slope, rise over run, is always less than one. Following these parameters exactly would give a jagged representation of a straight line. This is actually an example of aliasing, the continuous spatial image is sampled without first band-limiting the image. One way to anti-alias, or smooth the image, is to simply increase the resolution to the point where the abrupt changes are not noticeable. A cheaper and more practical solution may be to modulate the intensity of the pixels, to create the illusion to the human eye of a smooth line.

Controlling the intensity requires having some pixel resolution, and then instead of lighting only one pixel per point on the line, two or more pixels may be lit. When a line falls between two pixels, each pixel is lit in inverse proportion to its distance from the true point. For example, if the line is exactly one-fourth unit distance away from the bottom pixel, the bottom pixel is lit with three-fourths unit intensity, and the top pixel is lit with one-fourth unit intensity. Typically, the human eye will not resolve two adjacent pixels at normal viewing distances. Instead, the two pixels are merged into one, with an apparent intensity equal to the sum of the two, which is always unity. The merged pixel has an apparent position at the true point; that is, its position is inversely proportional to the relative intensities of the component pixels. Under this process, a line may be perceived to be a smooth line at its correct position. The same principle is applied in two dimensions to anti-alias end points of a certain vector. The intensity of the two end pixels depends on the position error of the true point in both directions. In order to do this, the end point must be projected. Projection simply requires moving the end point along the line of the vector back to the previous integer run coordinate, or forward to the next integer run coordinate. Run coordinates are either truncated or incremented to the proper integer value. This is actually performed only on the integer portion, since the fractional portion of the coordinate must be preserved for anti-aliasing. Starting rise coordinate is projected by multiplying the slope of the line with the change in a run coordinate. This product is then added to, or subtracted from, the starting rise value, after the vector generator 16 generates the appropriate signal for a vector and dumps it into one of the foreground display memories 14.

In summary, the vector generator 16 takes the end points of vectors, the output of geometry engine 18, and generates all the intermediate points of the vectors. The appropriate data is then written into the foreground display memory 14. Two banks of high speed static RAM for the foreground display memory 14 are contemplated. While the vector generator 16 is drawing the current scene into one bank of the foreground display memory 14, the output control and color map 12 is reading information from a previous scene out of the other bank of the foreground display memory 14. The information is stored in the form of a color and intensity code. This is passed through the output control and color map 12. Complete values for the red, green, and blue components, which are then applied to video digital/analog converters which generate the final analog signals to be supplied to display 10 through video signal line 11.

It is thought that the moving map display of the present invention, and many of its attendant advantages, will be understood from the foregoing description, and it will be apparent that various changes may be made in the form, construction, and arrangement of the parts thereof without departing from the spirit and scope of the invention, or sacrificing all of their material advantages, the forms hereinbefore described being merely preferred or exemplary embodiments thereof. It is the intention of the appended claims to cover all such changes.

We claim:

1. A moving map display comprising:
   a. a CPU having a system bus connected thereto;
   b. a system memory connected with said system bus;
   c. an input device connected with said system bus for entering data to said system memory;
   d. mass storage means connected with said system bus for storing image data;
   e. a first image data processing channel in connection with said system bus for generating an image from said image data;
   f. a second image data processing channel in connection with said system bus for processing said image data;
   g. a plurality of display memory banks in connection with said first image data processing channel and said second image data processing channel, for storing image data;
   h. a display device connected with said plurality of display memory banks for receiving and displaying said images;
   i. the first image data processing channel having an image memory interconnected with said system bus, for storing data representing a moving geographic map and an image processor interconnected with said image memory for scanning and processing image data in said image memory; and
   j. said second image data processing channel having a geometry engine interconnected with said system bus for processing vector endpoints of images to be displayed in addition to the moving geographical map and a vector generator interconnecting with said geometry engine for generating intermediate points in vectors to be displayed;
   whereby a moving map display with a rapid data update capability is achieved by providing the processing of the moving geographic map through the first image data processing channel together with providing the generation of the images from the geometry engine and the vector generator, by the second image data processing channel.

2. A display as in claim 1 further comprising an output control and color map for receiving image data from said plurality of display memory banks and converting the digital data to an analog video signal to be supplied to said display device.

3. A high speed moving map display system, of the type having rapidly selectable cultural features displayed over the moving map; the display system comprising:
   a. CPU having a system bus connected thereto;
   b. a system memory device connected with said system bus for entering data to said system memory;
   c. an input device connected with said system bus for entering data to said system memory;
   d. mass storage means connected with said system bus for storing geographical map data and cultural feature data;
   e. a first image data processing channel in connection with said system bus for generating an image from said geographic map data;
   f. a second image data processing channel in connection with said system bus for processing said rapidly selectable cultural feature data;
   g. a plurality of display memory banks in connection with said first image data processing channel and said second image data processing channel, for storing said geographic map data and said cultural featured data; and
   h. a display device connected with said plurality of display memory banks for receiving and displaying said images;
   whereby a high speed moving map display system with the capability of providing rapidly selectable cultural features displayed over the map is achieved by dividing the data within the mass storage means, on a functional basis, and separately processing the different functional data in separate and distinct image data processing channels.

4. A display system of claim 3 wherein said first image data processing channel further comprises:
   a. an image memory interconnected with said system bus, for storing data representing a moving geographic map;
   b. an image processor interconnected with said image memory for scanning and processing image data in said image memory.

5. A display system of claim 4 wherein said second image data processing channel further comprises:
   a. a geometry engine interconnected with said system bus for processing vector endpoints of images to be displayed and
   b. a vector generator interconnecting with said geometry engine for generating intermediate points in vectors to be displayed.

6. A display system of claim 5 further comprising an output control and color map for receiving image data from said plurality of display memory banks in converting the digital data to an analog video signal to be displayed to said display device.

* * * * *